UNITED STATES PATENT OFFICE.

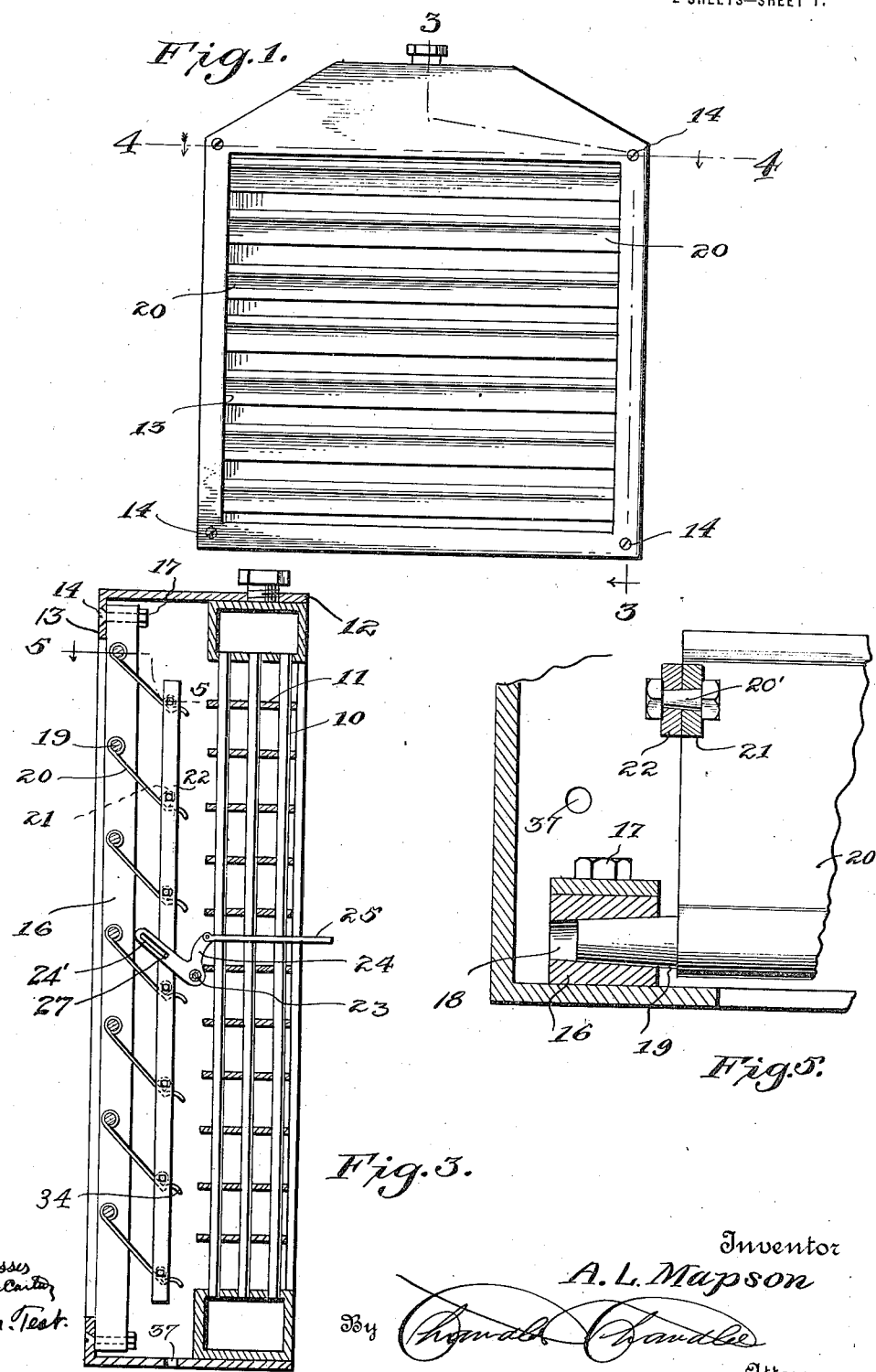

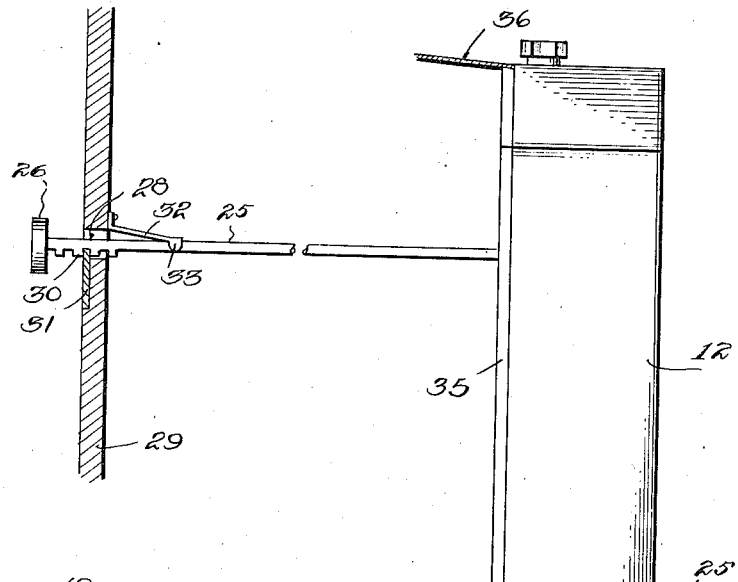
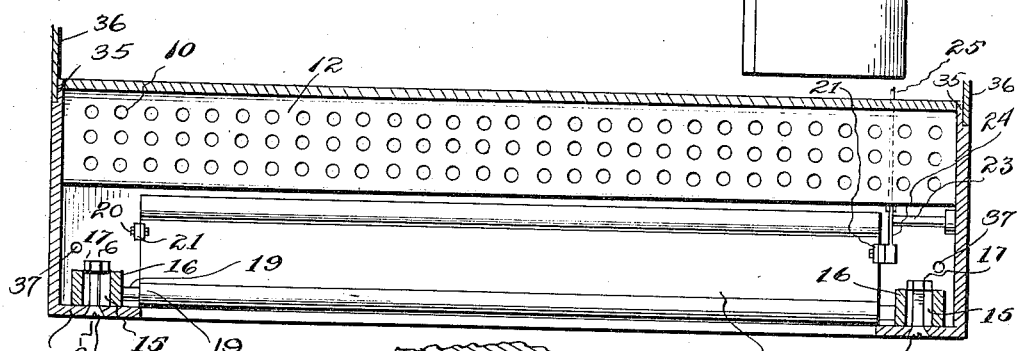
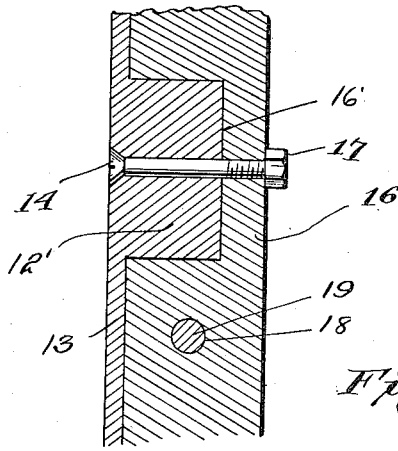

ARTHUR L. MAPSON, OF GRANADA, MINNESOTA.

RADIATOR-PROTECTOR.

1,310,870.  Specification of Letters Patent.  Patented July 22, 1919.

Application filed May 13, 1918. Serial No. 234,181.

*To all whom it may concern:*

Be it known that I, ARTHUR L. MAPSON, a citizen of the United States, residing at Granada, in the county of Martin, State of Minnesota, have invented certain new and useful Improvements in Radiator - Protectors; and I do hereby declare the following to be a full, clear, and exact description of the invention, such as will enable others skilled in the art to which it appertains to make and use the same.

My invention is an improvement in protectors for automobile radiators, and has for its object to provide a device of the character specified, easily and quickly applied to the radiator of an automobile and having movable protecting shutters capable of being opened or closed from the driver's seat, and wherein means is provided for taking up the wear on the trunnions of the shutters, so that there will be no loose movements in the working parts.

Other objects and advantages will be apparent from the following description when taken in connection with the accompanying drawings.

In the drawings:

Figure 1 is a front elevation of my invention applied to the radiator of an automobile.

Fig. 2 is a side elevation of the same and the dashboard of the automobile shown in section.

Fig. 3 is a vertical sectional view taken on the staggered line 3—3 of Fig. 1.

Fig. 4 is a horizontal sectional view taken on the line 4—4 of Fig. 1.

Fig. 5 is an enlarged horizontal sectional view taken on the line 5—5 of Fig. 3.

Fig. 6 is an enlarged vertical sectional view taken on the line 6—6 of Fig. 4.

Referring particularly to the accompanying drawings, 10 represents the tubes of the radiator, 11 the supporting plates therefor, and 12 the casing or bonnet which incloses said tubes and plates, and which extends forwardly from the front of the radiator. The front wall of the bonnet is formed with a large opening which results in the surrounding inturned flanges 13. Through the vertical portions of these flanges, and extending inwardly, are the bolts 14 which are received in the transverse slots 15 of the vertical bars 16. On the inner faces of the vertical flanges 13 there are formed the integral angular lugs 12' and in the faces of the bars 16 there are formed the angular recesses 16' into which said lugs are seated and adapted to slide transversely of said bars. The bolts 14 are disposed through the recesses and lugs, as clearly seen in Fig. 6 of the drawings. Nuts 17 are engaged on the inner ends of the bolts to retain the bars in proper position. By means of the bolts and slots the bars are capable of adjustment transversely of the bonnet, as will be readily understood. In each of the bars 16 there are formed a plurality of tapering openings 18 in which are received the correspondingly tapered ends of the shutter rods 19. Secured to each of these rods, and extending inwardly toward the radiator, is an elongated blade 20, the same being slightly greater in length than the width of the opening in the front of the bonnet. The ends of each of the blades are formed with the apertured lugs 21 which are pivotally connected to the rod 22 by means of the tapered bolts 20', said rod extending vertically in the bonnet, rearwardly of the shutter blades, as clearly seen in the drawing. Mounted on the inner face of one end wall of the bonnet is an inwardly extending stub shaft 23, and mounted on this shaft is a bell crank lever 24. One arm of the bell crank lever is formed with a slot 24' which receives a pin 27 carried by the adjacent rod 22, while its other arm is pivotally connected to an operating link 25, which extends rearwardly by the radiator and through an opening 28 in the dashboard 29 of the automobile, where it is provided with an operating handle or button 26. Formed on the lower face of the link 25, at the portion which passes through the opening of the dashboard, are the teeth 30 which are arranged to engage with the upper edge of the plate 31 secured to the inner face of the dashboard and which extends a short distance upwardly into said opening. A leaf spring 32 is secured to the outer face of the dashboard and bears on the upper side of the link 25 to normally urge the teeth into engagement with the plate, a pair of fingers 33 being formed on the free end of the spring to straddle the link and thus hold the spring in engagement therewith.

The free longer edges of the shutter blades are formed with the longitudinally grooved portions 34 which, when the said blades are closed, receive the portions of the adjacent blades which are carried by the rods 19. Thus the opening in front of the bonnet will be completely closed when the shutter blades are closed. The rear of the bonnet is formed with the groove 35 which snugly receives the forward edges of the hood 36.

The bars 16 are held in proper position by the engagement of the lugs 12' in the recesses 16', thus permitting the said bars to be readily moved in a direction transversely of the bonnet.

Thus when the rod or link 25 is moved in one direction and engaged with the plate 31, the shutters will be moved into overlapping relation in front of the radiator, thus preventing the cold air from blowing directly against the tubes of the radiator to cause the freezing of the water therein. When the blades are moved in the opposite direction, by a reverse movement of the link, the shutter blades will be swung away from each other and thus permit the air to pass therebetween and contact with the radiator tubes.

The bonnet, together with its contained mechanism, is adapted to be substituted for the radiator casing or shell now on the automobile radiators, the same being adapted also, by slight modifications in the general outline, to be fitted to any radiator.

What is claimed is:

1. A radiator protector including a casing having inturned flanges surrounding a front opening, vertical bars adjustable transversely of the vertical portions of the flanges, shutter blades pivotally carried by the bars and extending therebetween, and means for simultaneously moving the shutter blades into and out of overlapping position.

2. A radiator protector including a casing detachably carried by the radiator, transversely adjustable vertical bars mounted on the casing, shutter blades having tapering journal pins at their ends, said bars having tapering openings receiving said journal pins, rods connecting the free portions of the blades, and means for swinging the blades into and out of overlapping position.

3. A radiator protector including a casing, inturned vertical flanges formed on the casing and surrounding a central opening in the front of the casing, vertical bars disposed against the inner faces of the flanges, said flanges being formed with angular lugs, the said bars being formed with angular recesses for reception of the said lugs, said bars being formed with transverse slots, bolts disposed through the flanges and said slots, shutter blades having tapering journal pins on the ends thereof, said bars having tapering openings receiving said journal pins, a slotted lever mounted in the casing, means pivotally connecting the shutters, a projection carried by one of said connecting means and disposed through the lever slot, and operating means for the lever to swing the shutters.

In testimony whereof, I affix my signature, in the presence of two witnesses.

ARTHUR L. MAPSON.

Witnesses:
 HARRY M. TEST,
 IVAN S. CARPENTER.